June 6, 1967        J. E. POE        3,323,562

SAW BIT

Filed Feb. 26, 1965

Joseph E. Poe
INVENTOR.

United States Patent Office 3,323,562
Patented June 6, 1967

3,323,562
SAW BIT
Joseph E. Poe, R.F.D. 1, Warrensville, N.C. 28693
Filed Feb. 26, 1965, Ser. No. 435,569
7 Claims. (Cl. 143—141)

This invention relates to an insert-type chisel tooth for circular saws and more specifically to a chisel tooth of the aforementioned type including a configuration that will facilitate the egress of chips and dust from the kerf made by the circular saw supporting the chisel tooth of the instant invention.

Circular saws of present day design support various types of chisel teeth and are powered to advance these chisel teeth at extremely high speed, as high as 166 feet per second. One of the most popular inserted chisel tooth presently in use is provided with a rounded pocket inwardly of the base end of the chisel tip and the forward face of this pocket is substantially the same width as the chisel tip itself. The high speed at which circular saws operate causes air disposed forwardly of such a rounded pocket to be compressed and this compressed air does not allow dust and chips to be readily passed into the gullet and thereafter out of the kerf or cut made by the saw.

The insert-type chisel tooth of the instant invention is very similar to the above-mentioned chisel tooth which is presently in use but comprises an improvement thereover inasmuch as it is provided with means defining air pressure relief passages on opposite sides of the tooth extending rearwardly from the afore-mentioned pocket thereof. These air pressure relief passages greatly reduce the compression of air forwardly of the afore-mentioned pocket and the resultant reduction of air pressure results in three improvements in operation. First, the dust and chips tend to readily fall into the gullet and therefore binding and jamming due to an accumulation of dust and chips forwardly of the pocket is greatly reduced. Secondly, by allowing a reduction of air pressure forwardly of the pocket less friction and drag due to excessive air pressure is realized. Thirdly, the aggregate reduction in friction results in less wear on the ring holding the saw tooth in position on the saw blade and the reduction in power requirement to operate the saw at a desired speed. Further, when a circular saw equipped with insert-type chisel teeth of the instant invention is used to cut frozen lumber, the usual clogging and jamming of dust, chips and ice that causes the saw to veer from the intended line of cut is greatly reduced.

The main object of this invention is to provide an insert-type of chisel tooth for chisel saws constructed in a manner whereby the dust and chips cut from the lumber being sawn more readily fall into the gullet of the saw and thereafter out of the kerf made by the saw.

Another object of this invention is to provide a chisel tooth, in accordance with the preceding object, which, because of its configuration, will reduce the compression of air in the pocket of the tooth disposed inwardly of the cutting edge thereof thereby reducing drag on the circular saw caused by excessive air compression.

Yet another object of this invention is to provide a chisel-type tooth in accordance with the preceding objects including means rendering the associated circular saw more adaptable for cutting frozen lumber.

A final object of this invention to be specifically enumerated herein is to provide an insert-type chisel tooth for circular saws which will conform to conventional forms in manufacture, be of simple construction and comprise a ready replacement for existing types of insert chisel teeth so as to provide a device that will be economically feasible, long lasting and adapted to be used in substantially all types of existing circular saws provided with insert-type teeth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
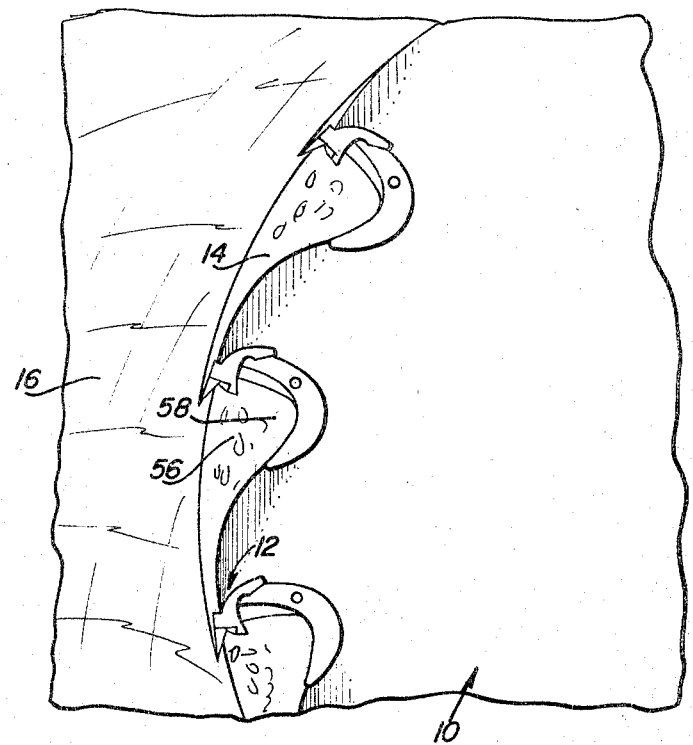
FIGURE 1 is a fragmentary side elevational view of a circular saw equipped with insert-type chisel teeth constructed in accordance with the present invention, the circular saw being illustrated cutting through a piece of lumber shown in vertical section.

Referring now more specifically to the drawings, the numeral 10 generally designates a conventional form of circular saw which has a plurality of the insert-type chisel teeth 12 of the instant invention mounted thereon and which is illustrated in FIGURE 1 of the drawings forming a cut or kerf 14 through a piece of lumber 16.

Figure 2:
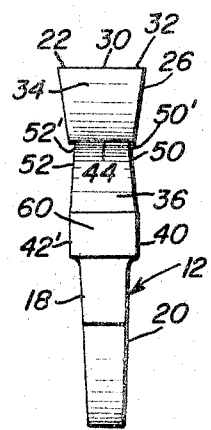
FIGURE 2 is a front elevational view of the tooth of the instant invention.
Figure 3:
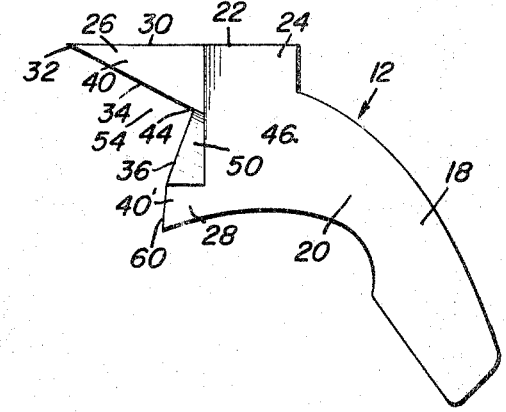
FIGURE 3 is a side elevational view of the saw tooth.
Figure 4:
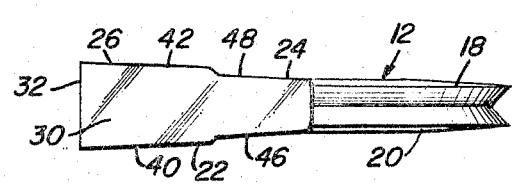
FIGURE 4 is a top plan view of the saw tooth.

With attention now invited to FIGURES 2–4, it may be seen that the tooth 12 comprises an elongated arcuate member 18 including a rear leg portion 20 and a forward cutting head portion 22 which includes a base end 24 and a chisel head 26.

The base end 24 of the head portion 22 and the adjacent portion of the chisel head 26 include an inwardly projecting lug 28. The chisel head 26 includes a generally planar outer surface 30 which extends rearwardly from the cutting edge 32 and is inclined rearwardly and outwardly away from the arcuate member 18. In addition, the chisel head 26 includes a generally planar inner surface 34 extending rearwardly from the cutting edge 32 disposed at generally right angles to the radius of curvature of the arcuate member 18.

The forward surface 36 of the lug 28 terminates at its radial outermost and at the rear end of the inner surface 34 and at generally right angles to the inner surface 34.

The chisel head 26 includes generally planar and rearwardly converging opposite side surfaces 40 and 42 which extend between the inner and outer surfaces 30 and 34 and including portions 40' and 42' on the lug 28. The opposite side surfaces 40 and 42 terminate rearwardly of the juncture 44 of the forward and inner surfaces 36 and 34 and the arcuate member 18, rearwardly of the side surfaces 40 and 42, is relieved as at 46 and 48 so as to be reduced in thickness. The portions of the side surfaces 40 and 42 on the lug 28 and adjacent the inner surface 34 are relieved as at 50 and 52 radially inwardly diverging planes extending inwardly from the inner surface 34 forming passages 50' and 52', respectively, extending rearwardly along of said sides of the arcuate member and communicated at their forward ends with the inwardly opening pocket 54 defined by the adjacent portions of the inner and forward surfaces 34 and 36 and communicated with the relieved portions 46 and 48 at their rear ends.

In operation, the saw 10 is rotated at high speed to form the cut or kerf 14 in the lumber 16 and the passages 50' and 52' allow for the passage of compressed air out of the pocket 54 rearwardly of the insert-type chisel teeth 12. Thus, a considerable reduction of drag is realized by the reduction of air pressure in the pocket 54. Further, a reduction of air pressure allows the chips and dust 56 to more readily fall into the gullet 58 and thereafter out of the kerf or cut 14.

The radial innermost end 60 of the forward surface 36 is inclined or curved inwardly and rearwardly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An insert type chisel tooth for circular saw, said tooth including an elongated arcuate member defining a leg portion at one end and a cutting head portion at the other end, said cutting head portion including a base end adjacent said leg portion and an adjacent chisel head remote from said leg portion, said base end of said head portion and the adjacent portion of said chisel head including an inwardly projecting lug, said chisel head including a chisel point projecting forwardly of said base end and including a transverse forward cutting edge, said chisel point including a generally planar outer surface extending rearwardly from said cutting edge inclined rearwardly and outwardly away from said arcuate member and a generally planar inner surface extending rearwardly from said cutting edge disposed at generally right angles to the radius of curvature of said arcuate member, the forward surface of said lug terminating outwardly at the rear end of said inner surface and being disposed, adjacent said inner surface, at generally right angles relative to said inner surface, said chisel point including generally planar side surfaces extending between said inner and outer surfaces converging rearwardly from said cutting edge and extending inwardly on at least the forward portion of said lug, said side surfaces terminating rearwardly of the juncture of said inner and forward surfaces in said base end of said head portion, said arcuate member, rearwardly of said side surfaces, being relieved on its opposite sides so as to be reduced in thickness, the portions of said side surfaces on said lug and adjacent said inner surface being relieved along inwardly diverging planes extending inwardly from said inner surface forming passages extending rearwardly along opposite sides of said arcuate member communicated at their forward ends with the inwardly opening pocket formed by the adjacent portions of said forward and inner surfaces and at their rear ends with the relieved areas on the opposite sides of said arcuate member disposed rearwardly of said converging planar side surfaces.

2. The combination of claim 1 wherein the included angle formed by said forward and inner surfaces is slightly greater than 90°.

3. An insert type chisel tooth for circular saws, said tooth including an elongated arcuate member including front and rear sections, said front sections being wider than said rear section and including generally planar forwardly diverging side surfaces interconnecting an outer rearwardly and outwardly inclined surface and a generally planar inner surface terminating rearwardly at a point forward of the rear ends of said forwardly diverging side surfaces, said arcuate member including an inwardly projecting lug at the juncture of said front and rear and defined at least in part by said planar side surfaces and including a forward surface extending generally radially inwardly from the rear end of said inner surface, the portions of said side surfaces on said lug adjacent said inner surface being relieved along inwardly diverging planes extending inwardly from said inner surface forming passages extending rearwardly along opposite sides of said arcuate member communicated at their forward ends with the inwardly opening pocket formed by the adjacent portions of said forward and inner surfaces and at their rear ends with the relieved areas on the opposite sides of said arcuate member disposed rearwardly of said converging planar side surfaces.

4. The combination of claim 3 wherein the included angle formed by said forward and inner surfaces is slightly greater than 90°.

5. The combination of claim 3 wherein said rear section includes inwardly divergent side surfaces.

6. The combination of claim 3 wherein the innermost portion of said forward surface curves rearwardly and inwardly.

7. The combination of claim 3 wherein said outer surface is substantially planar.

References Cited

UNITED STATES PATENTS

| | | | |
|---|---|---|---|
| 2,734,534 | 2/1956 | Standal | 143—141 X |
| 3,236,712 | 2/1966 | Fruits | 143—141 |

DONALD R. SCHRAN, *Primary Examiner.*